(12) United States Patent
Huynh

(10) Patent No.: US 7,987,235 B2
(45) Date of Patent: Jul. 26, 2011

(54) SYSTEM AND METHOD FOR DELAYED ACKNOWLEDGMENT OF CLIENT REQUESTS IN ELECTRONIC MAIL SYSTEM

(75) Inventor: Truyen Huynh, Kitchener (CA)

(73) Assignee: Research in Motion Limited, Waterloo, Ontario (CA)

( * ) Notice: Subject to any disclaimer, the term of this patent is extended or adjusted under 35 U.S.C. 154(b) by 1137 days.

(21) Appl. No.: 11/537,732

(22) Filed: Oct. 2, 2006

(65) Prior Publication Data

US 2008/0082409 A1  Apr. 3, 2008

(51) Int. Cl.
 *G06G 15/16* (2006.01)
 *G06F 9/46* (2006.01)
(52) U.S. Cl. ........................................ 709/206; 718/100
(58) Field of Classification Search .................. 709/206; 718/100
 See application file for complete search history.

(56) References Cited

U.S. PATENT DOCUMENTS

| 6,449,635 B1 | 9/2002 | Tilden, Jr. et al. ............ 709/206 |
| 2004/0185834 A1* | 9/2004 | Sommers et al. .......... 455/414.1 |
| 2005/0255869 A1 | 11/2005 | Byers et al. .................... 455/466 |
| 2007/0299918 A1* | 12/2007 | Roberts ........................ 709/206 |

\* cited by examiner

*Primary Examiner* — Thu Nguyen
*Assistant Examiner* — Joseph Greene
(74) *Attorney, Agent, or Firm* — Allen, Dyer, Doppelt, Milbrath & Gilchrist, P.A.

(57) ABSTRACT

An electronic mail (email) communication system includes a mobile office platform. A direct access proxy accesses an electronic mailbox of the user and pushes email from the electronic mailbox of the user to a wireless communications device. A web client engine is operative with the mobile office platform and includes a port agent module that communicates with the wireless communications device over a port agent connection. It is operative to receive a message from a wireless communications device as a request corresponding to a job to be completed. A worker module receives the message from the port agent module and completes the job. The web client engine attempts to process jobs within a specified delay time, and if successful, transmits an acknowledgment (ACK) to indicate the job has been completed without saving the message to a jobstore database. If the job has not been completed within a specified delay time, the message can be saved to the database.

20 Claims, 12 Drawing Sheets

SYSTEM AND METHOD FOR DELAYED ACKNOWLEDGMENT OF CLIENT REQUESTS IN ELECTRONIC MAIL SYSTEM

FIELD OF THE INVENTION

The present invention relates to the field of communications systems, and, more particularly, to electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails from mailboxes stored on different email storage servers (edg., corporate email storage server, Yahoo, Hotmail, AOL, etc.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

One particularly advantageous "push" type email distribution and synchronization system is disclosed in U.S. Pat. No. 6,779,019 to Mousseau et al., which is assigned to the present Assignee and is hereby incorporated herein by reference. This system pushes user-selected data items from a host system to a user's mobile wireless communications device upon detecting the occurrence of one or more user-defined event triggers. The user may then move (or file) the data items to a particular folder within a folder hierarchy stored in the mobile wireless communications device, or may execute some other system operation on a data item. Software operating at the device and the host system then synchronizes the folder hierarchy of the device with a folder hierarchy of the host system, and any actions executed on the data items at the device are then automatically replicated on the same data items stored at the host system, thus eliminating the need for the user to manually replicate actions at the host system that have been executed at the mobile wireless communications device.

The foregoing system advantageously provides great convenience to users of wireless email communication devices for organizing and managing their email messages. Yet, further convenience and efficiency features may be desired in email distribution and synchronization systems as email usage continues to grow in popularity.

One conventional solution for acknowledging a completed transaction between a client and a server using an email system allows a server to acknowledge to the client that it has received a request successfully by sending an acknowledgment (ACK) back to the client. The request could correspond to a request for data or to complete some job. This usually occurs after it has received and saved the request/data to a jobstore/database successfully such that the client will not resubmit the request again for the transaction. The server usually saves the request to the jobstore and removes the request/data after the transaction for the request to be processed.

The purpose of storing the request is for job recovery in case the server shuts operation. It can recover the pending requests from the jobstore. A drawback to this may not be as efficient as desired because the server requires many input/output operations for saving the requests, updating requests statuses, and removing the requests after they have been processed. Specifically, when the jobstore server, for example, a file server or other database is slow, the server throughput will be impacted significantly.

BRIEF DESCRIPTION OF THE DRAWINGS

Other objects, features and advantages of different embodiments will become apparent from the detailed description which follows, when considered in light of the accompanying drawings in which.

DETAILED DESCRIPTION OF THE PREFERRED EMBODIMENTS

Figure 1:
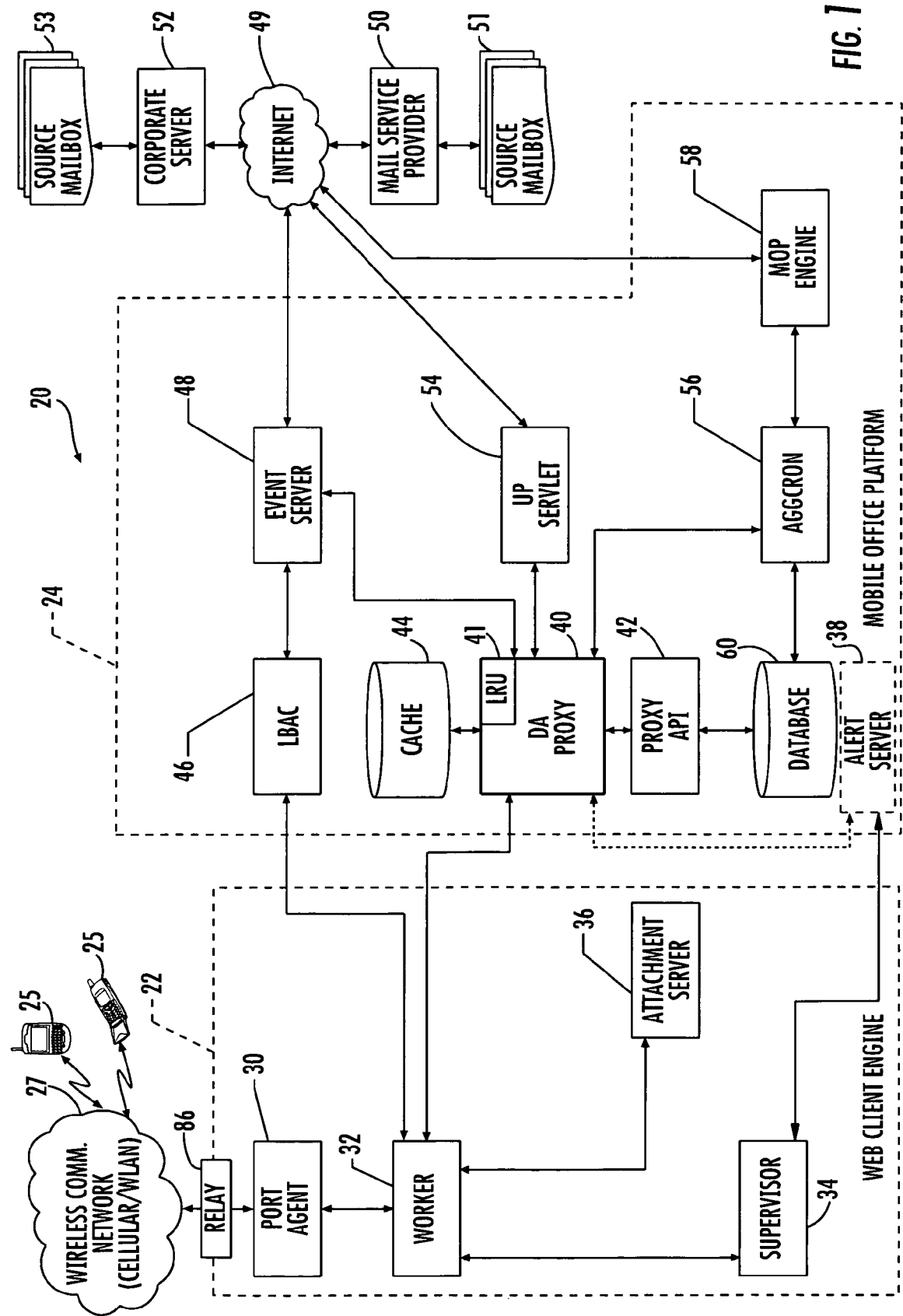
FIG. 1 is schematic block diagram of a direct access electronic mail (email) distribution and synchronization system.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

An electronic mail (email) communication system includes a mobile office platform. A direct access proxy accesses an electronic mailbox of the user and pushes email from the electronic mailbox of the user through the web client engine to a wireless communications device. A web client engine is operative with the mobile office platform and includes supervisor modules, worker modules and port agent modules that communicate with the wireless communications device through relay system over SRP (Service-Relay Protocol) connections. A supervisor module receives new servicebook and email notifications from the direct access proxy and assigns them to the workers for processing. A worker module receives new servicebook or email notifications from a supervisor module. It then retrieves the email from the electronic mailbox of the user through the direct access proxy, processes it and sends to port agent for delivery to the user wireless communications device. A worker module also receives messages from the port agent modules and delivers the messages to the recipient(s) through the direct access proxy. A port agent module is operative to receive a message from a worker module and deliver it to the wireless communications device through relay. A port agent module is also operative to receive a message from a wireless communications device through relay as a request corresponding to a job to be completed.

A database can store any messages as requests. The web client engine can be operative for attempting to process the job within a specified delay time. If successful, the web client engine can transmit an acknowledgment (ACK) back to the wireless communications device to indicate that the job has been completed without saving the message as a request to the database. If the job has not been completed within a specified delay time, the request can be saved in the database and an ACK transmitted back to the wireless communications device indicating that the request has been received and is stored at the database.

In one aspect, a relay module receives any messages from a wireless communications device and transfers messages to an available port agent module. The relay module can be operative for receiving an ACK from a port agent module and transferring the ACK to the wireless communications device. The port agent module can also be operative for delaying the transmission of an ACK back to the relay module, while a worker module is assigned the request corresponding to the job to be completed. This relay module can retry communication with the port agent module if an ACK is not received within a specified delay time.

In yet another aspect, the port agent transmits an ACK until it receives an indication that the request corresponding to the job to be completed is committed, and completed or failed. A database can be formed as a port agent jobstore. In one aspect, the message can be formed as a message from handheld (MFH) data packet.

A method aspect and computer-readable medium having computer executable instructions for executing functions is also set forth.

To resolve or reduce the input/output problems as identified above, a timed delay is implemented for saving the request to the jobstore. The mail system is operative such that the request is saved if it cannot be completed in the specified delay time. When a server receives a request from the client, it will not save or acknowledge (ACK) back to the client immediately. Instead, the server will attempt to process the request. If the transaction can be completed within the specified delay time, the system will forward the ACK and completed status back to the client to indicate the transaction is complete without actually saving the request to the jobstore. If the transaction cannot be completed within the specified delay time, the timer will time out the request and it will be saved to the jobstore. The server will send the ACK back to the client, indicating that the requests have been received and saved safely in the server. Usually, a transaction is completed quickly within the delay time and will not require that the request be saved to the jobstore. This will save the input/output operation for the server and improve the throughput for the server significantly.

Referring initially to FIG. 1, a direct access (DA) email distribution and synchronization system 20 allows direct access to different mail sources, allowing messages to be transferred directly to a mobile wireless handheld device from a source mailbox. As a result, different mail stores need not be used for integrated external source mail accounts, and a permanent copy of an email in a local email store is not required.

Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

The direct access system 20 enables email users or subscribers to have email from third party email services pushed to various mobile wireless communications devices 25. Users need not create a handheld email account to gain direct access to an existing external email account. The direct access system 20 may operate without performing aggregation as used in some prior art systems, in which emails are aggregated from multiple different source mailboxes to a single target mailbox. In other words, email need not be stored in an intermediate target mailbox, but instead may advantageously be accessed directly from a source mail store.

As illustrated in FIG. 1, the direct access system 20 illustratively includes a Web client (WC) engine 22 and a mobile office platform (MOP) 24. These Web client engine 22 and mobile office platform 24 operate together to provide users with direct access to their email from mobile wireless communications devices 25 via one or more wireless communications networks 27, for example. Both the Web client engine 22 and the mobile office platform 24 may be located at the same location or at separate locations, and implemented in one or more servers. The web client engine 22 illustratively includes one or more port agents 30 (port agent modules) for communicating with the wireless communications devices 25 via the wireless communications network(s) 27, one or more workers 32 (worker modules), one or more supervisors 34 (supervisor modules), and one or more attachment servers 36, which will be discussed further below.

The mobile office platform 24 illustratively includes a DA proxy 40, and a proxy application programming interface (API) 42 and a cache 44 cooperating with the DA proxy. The mobile office platform 24 also illustratively includes a load balance and cache (LBAC) module 46, an event server 48, a universal proxy (UP) Servlet 54, an AggCron module 56, a mobile office platform (MOP) engine 58, and a database (OB) engine 60, which will be discussed in further detail below. The Least Recently Used (LRU) cache 41 caches new messages, and can release messages and objects that were least recently used. An alert server 38 is shown in dashed lines, and in one preferred embodiment, is not used, but could be part of the system in yet other embodiments.

The supervisor 34 processes new mail notifications that it receives from the direct access proxy 40. It then assigns a job, in the form of a User Datagram Protocol (UDP) packet, to the least-loaded worker 32, according to the most recent UDP heartbeat the supervisor 34 has received. For purposes of this description, heartbeat is a tool that monitors the state of the server. Additionally, the supervisor 34 will receive a new service book request from the direct access proxy 40 to send service books to the mobile wireless communication device for new or changed accounts. A service book can be a class that could contain all service records currently defined. This class can be used to maintain a collection of information about the device, such as connection information or services, such as an email address of the account.

The worker 32 is an intermediary processing agent between the supervisor 34 and the port agent 30, and responsible for most processing in the Web client engine 22. It will retrieve e-mail from a universal proxy 54, via a direct access proxy, and format e-mail in Compressed Multipurpose Internet Mail Extension (CMIME) as a type of Multipurpose Internet Mail Extension, and send it to the port agent 30, for further processing. Its responsibilities include the following tasks: (1) messages sent to and received from the handheld; (2) message reply, forward and more requests; (3) Over The Air Folder Management operation (OTAFM); (4) attachment viewing; and (5) service book.

The port agent 30 acts as a transport layer between the infrastructure and the rest of the Web client engine 22. It is responsible for delivering packets to and from the mobile wireless communications device. To support different integrated mailboxes with one device, more than one service book can be used, and each service book can be associated with one integrated mailbox. A port agent 30 can include one Server Relay Protocol (SRP) connection to a relay, but it can also handle multiple SRP connections, and each connection may have a unique Globally Unique Identifier (GUID) associated with a service book. The attachment server 36 provides service for document/attachment conversion requests from workers 32.

The direct access proxy 40 provides a Web-based Distributed Authoring and Versioning (WebDAV) interface that is used by the worker 32 to access account and mailbox information. This provides functionality to create, change and move documents on a remote server, e.g., a Web server. The direct access proxy 40 typically will present an asynchronous interface to its clients. The LBAC module 46 is used by a notification server and the Web client engine 22 components to locate the proper DA proxy for the handling of a request. The universal proxy Servlet 54 abstracts access to disparate mail stores into a common protocol. The event server 48 responds to notifications of new messages from corporate servers 52 and/or mail service providers 50, which may be received via the Internet 40, for example. The notifications are communicated to the direct access proxy 40 by the AggCron module 56 and the event server 48 so that it may initiate checking for new mail on source mailboxes 51, 53 of the mail service providers 50 and/or corporate servers 52. The proxy API can be a Simple Object Access Protocol (SOAP) Daemon 42 and is the primary interface into a database 60, which is the primary data store for the mobile office platform 24. The AggCron module 56 may also periodically initiate polling for new messages as well.

Figure 2:
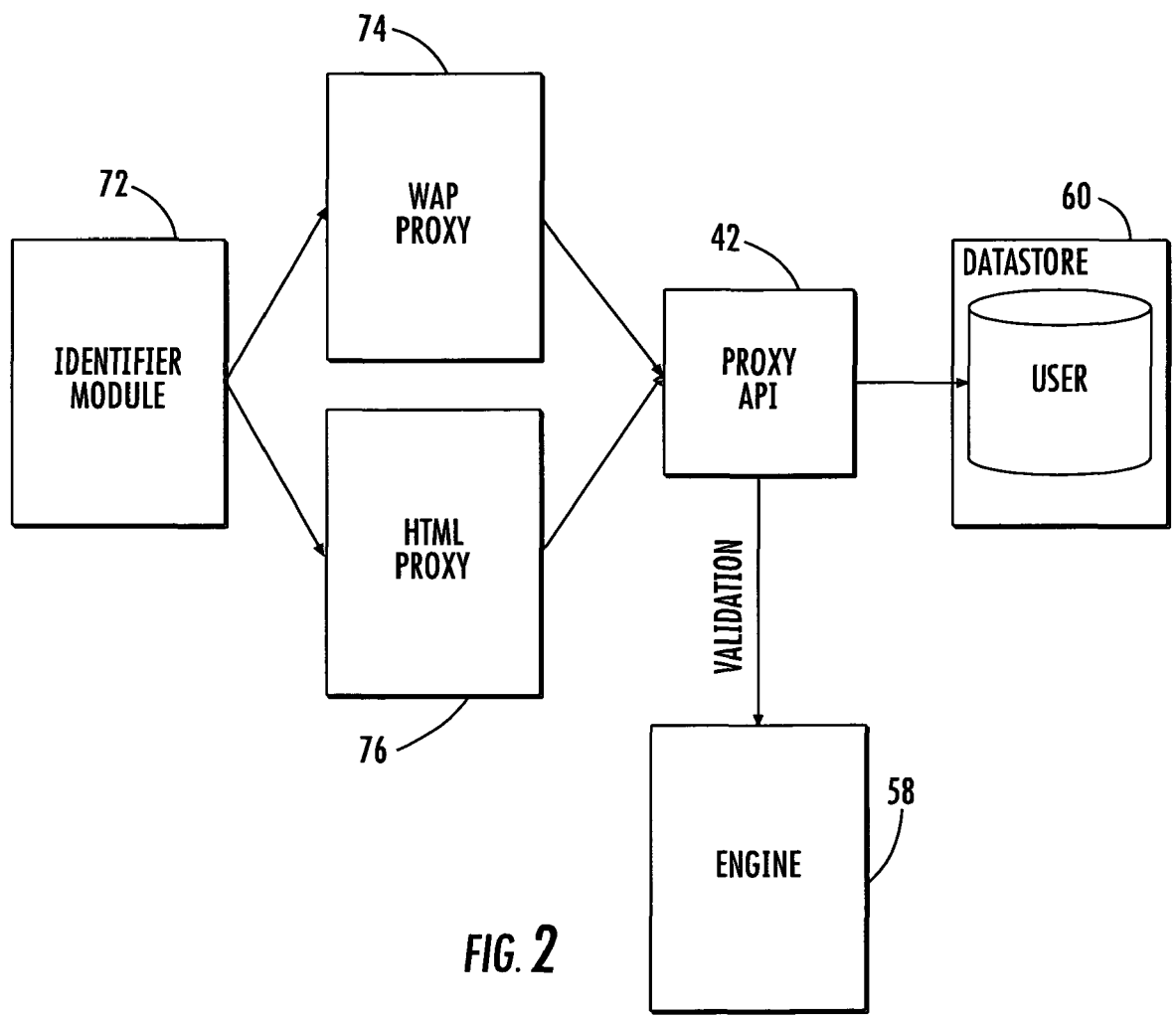
FIG. 2 is a schematic block diagram of an exemplary embodiment of user interface components of the direct access proxy of the system of FIG. 1.

FIG. 2 is a high-level block diagram showing user interface components of the direct access proxy 40. More particularly, the direct access proxy 40 illustratively includes an identifier module 72 with various downstream proxy modules for different communication formats, such as a Wireless Application Protocol (WAP) proxy module 74 and a Hypertext Markup Language (HTML) proxy module 76. Of course, it will be appreciated by those skilled in the art that other types of proxy modules for other communications formats may also be used.

The identifier module 72 provides a centralized authentication service for the direct access system 20 and other services. An authentication handshake may be provided between an ID service and direct access system 20 to ensure that users have the proper credentials before they are allowed access to the direct access system 20. The ability to switch from managing a Web client to a direct access system, or vice versa, may occur without requiring the user to re-enter any login credentials. Any Web client and direct access may share session management information on behalf of a user.

The WAP proxy 74 provides a wireless markup language (WML)-based user interface for configuring source mailboxes with the mobile office platform 24. The HTML proxy 76 provides an HTML-based user interface for configuring of source mailboxes in the MOP 24. The proxy API 42 (SOAP Daemon) is the primary interface into the database 60. The engine 58 is a protocol translator that connects to a source mailbox to validate configuration parameters. The database 60 is the primary user data store for the mobile office platform 24.

Figure 3:
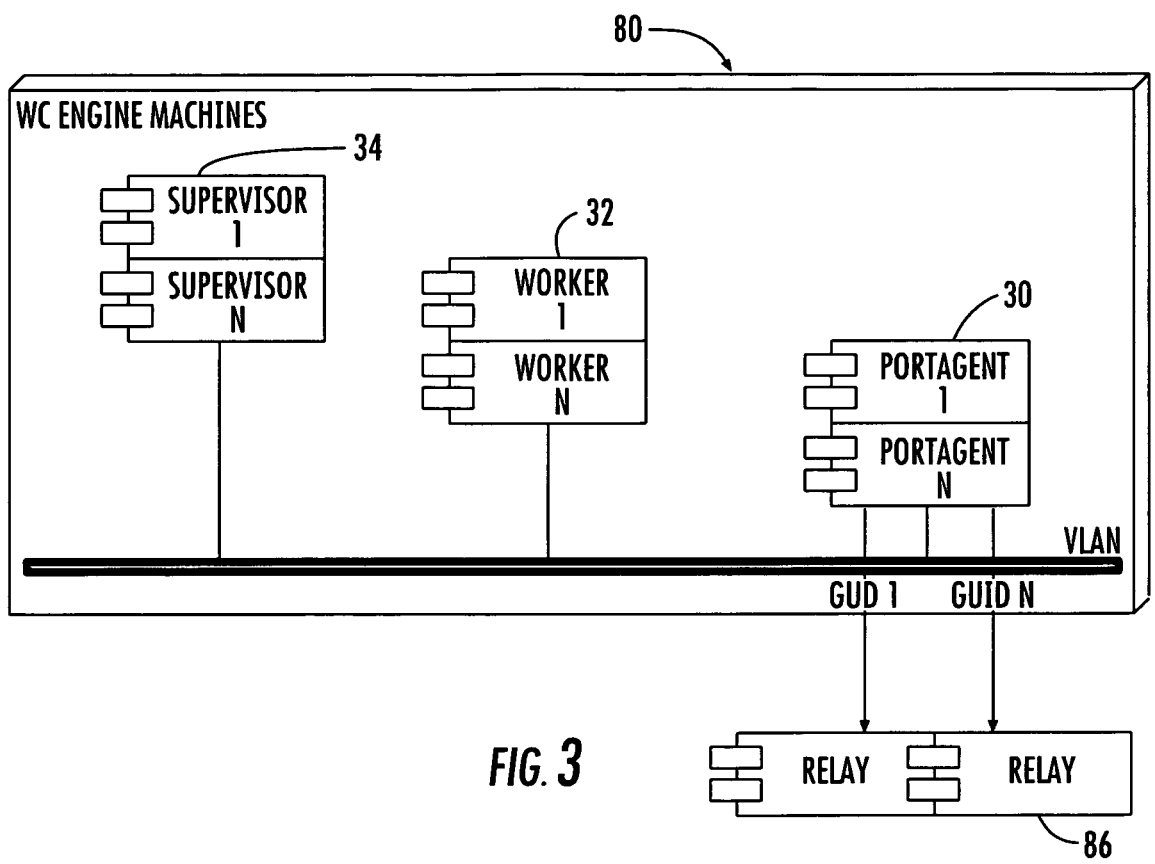
FIG. 3 is a schematic block diagram of an exemplary embodiment of the Web client engine of the system of FIG. 1.
Figure 4:
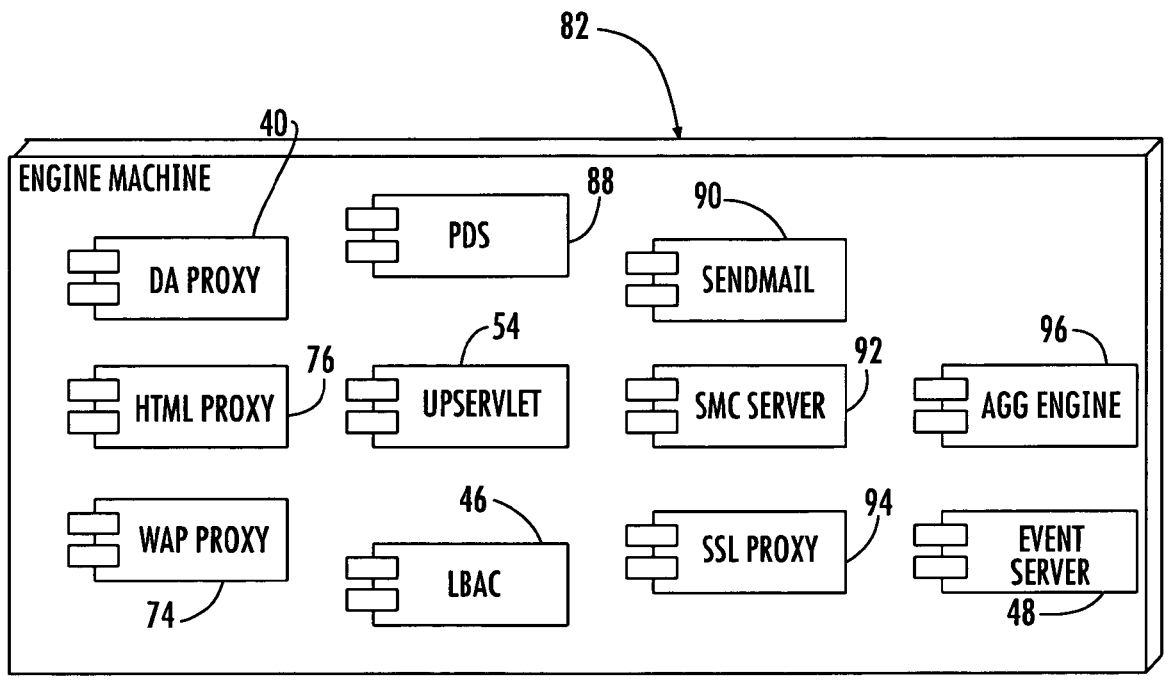
FIGS. 4 is a schematic block diagram of an exemplary embodiment of the mobile office platform engine machine for use in the system of FIG. 1.
Figure 5:
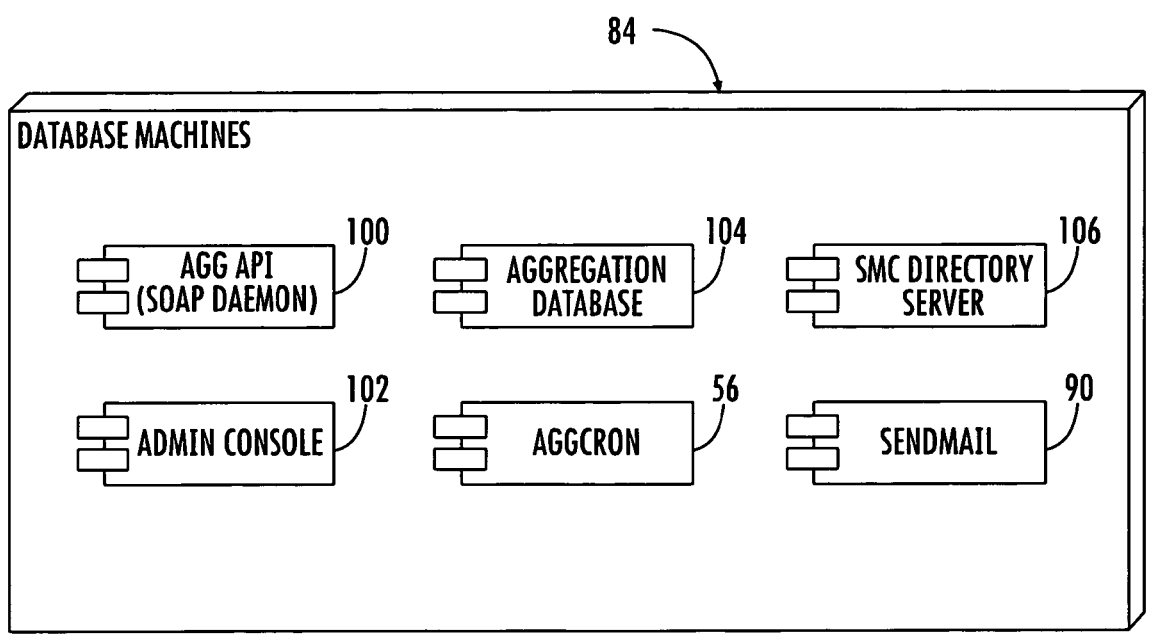
FIG. 5 is a schematic block diagram of an exemplary embodiment of the database module of the system of FIG. 1.

FIGS. 3, 4 and 5 illustrate respective Web client engine machines 80 (FIG. 3), an engine machine 82 (FIG. 4), and database machine 84 (FIG. 5). The Web client engine machine 80 illustratively includes the supervisors 34, workers 36, and port agents 38. Relays 86 (relay modules) cooperate with the port agents 38 using a GUID.

The engine machine 82 illustratively includes a direct access proxy 40, HTML proxy 76, WAP proxy 74, PDS module 88, UP Servlet 54, LBAC module 46, a sendmail module 90, an secure mail client (SMC) server 92, a secure sockets layer (SSL) proxy 94, an aggregation engine 96, and event server 48. The SMC server 92 cooperates with corresponding SMC modules resident on certain corporate networks, for example, to convey email data between the mobile office platform 24 and source mailboxes. The database machine 84 may include an aggregation application programming interface (API) 100 as a SOAP Daemon, an administration console 102, an aggregation database 104, the AggCron module 56, an SMC directory server 106, and a send mail module 90.

The various components of the Web client engine 22 may be configured to run on different machines or servers. The component binaries and configuration files may either be placed in a directory on the network or placed on a local disk that can be accessed to allow the appropriate components to run from each machine. In accordance with one exemplary implementation, deployment may include one supervisor, two workers, and one port agent for supporting 30,000 external source mailboxes, although other configurations may also be used. Actual production deployment may depend on the results of load, performance and stress testing, as will be appreciated by those skilled in the art.

For the mobile office platform 24 direct access components, modules and various functions, machines are typically installed in two configurations, namely engine machines (FIG. 4) and database machines (FIG. 5). While these machines may have all of the above-described components installed on them, not all of these components need be active in all applications (e.g., aggregation may be used with systems that do not support push technology, etc.). Once again, actual production deployment may depend on the results of load, performance and stress testing.

The mobile office platform 24 architecture in one known technique advantageously uses a set of device/language-specific Extensible Stylesheet Language (XSL) files, which transform application data into presentation information. In one non-limiting example, a build process takes a non-localized XSL and generates a localized XSL for each supported language. When the XSL is used, it is "compiled" in memory and cached for repeated use. The purpose of pre-localizing and caching the templates is to reduce the CPU cycles required to generate a presentation page, Branding may also be performed. Initially, a localized XSL may build a WAP application to access aggregated email accounts. A WAP proxy application may be localizable and support multiple WAP devices. For each logical page of an application, a device-specific XSL may be created, which may be localized for each language/country supported. This rendering scheme may support not only WAP devices, but also SMTP, HTML and POP proxies, for example. In branding, each page of a given application may be customized for each different brand.

The branding of a page may be accomplished through XSL imports, including the use of a Java application programming interface (API) for XML processing (JAXP) feature to resolve the imports dynamically. This need not require that each combined page/brand template be compiled and cached. By way of example, in a sample template directory, first and second pages for a single language/country may be combined with branded counterparts to generate a plurality of distinct template combinations. It is also possible to profile memory requirements of an application by loading templates for a single language, device/application and brand. An HTML device may include a set of templates that are large compared to other devices.

In one known technique, the mobile office platform 24 advantageously builds processes and takes non-localized files and language-specific property files and combines them to make each non-localized XSL into an XSL for each supported language. A separate XSL for each language need not be used, and the language factor may be removed from the memory usage equation. A JAXP API may be used to extend XSL with Java classes. The extensions may take various forms, for example, including extension elements and extension functions. A template may be transformed by creating and initializing an extension object with a locale and passing an object to a transformer. The system can remove multiple imports and use less memory. HTML templates can use template importing to enable template reuse, much like Java classes, and reuse other Java classes through a mechanism like derivation or importing In the direct access system 20, users receive email on their mobile wireless communications devices 25 from multiple external accounts, and when replying to a received message, the reply-to and sent-from address integrity is preserved. For example, for a user that has an integrated Yahoo! account (user@yahoo.com) and a POP3 account (user@pop3.com), if they receive an email at user@yahoo.com, their replies generated from the device 25 will appear to come from user@yahoo.com. Similarly, if a user receives an email at user@pop3.com, their replies will appear to come from user@pop3.com.

Selection of the "sent from" address is also available to a user that composes new messages. The user will have the ability to select the "sent from" address when composing a new message. Depending on the source mailbox type and protocol, the message may also be sent through the source mail service. This functionality can be supported by sending a configuration for each source mailbox, for example, as a non-limiting example, a service book for each source mailbox 51, 53 to the mobile wireless communications device 25.

As noted above, a service book is a class that may include all service records currently defined. This class may be used to maintain a collection of information about the device, such as connection information. The service book may be used to manage HTTP connections and mail (CMIME) information such as account and hierachy. At mobile wireless communications devices 25, a delete service book request may be sent when a source mailbox 51, 53 is removed from the account. The service book may also be resent to the device 25 with a viewable name that gives the user some indication that the selection is no longer valid.

A sent items folder may also be "synchronized." Any device-originated sent messages may be propagated to a source account and stored in a sent mail folder, for example. Also, messages deleted on the device 25 may correspondingly be deleted from the source mailbox 51, 53. Another example is that device-originated marking of a message as read or unread on the device 25 may similarly be propagated to the source mailbox 51, 53. While the foregoing features are described as source-dependent and synchronizing one-way, in some embodiments certain synchronization features may in addition, or instead, propagate from the source mailbox/ account to the handheld device, as will be appreciated by those skilled in the art.

When available, the mail service provider or corporate mail server may be used for submission of outgoing messages. While this may not be possible for all mail service providers or servers, it is preferably used when available as it may provide several advantages. For example, subscribers to AOL will get the benefit of AOL-specific features like parental controls. Furthermore, AOL and Yahoo users, as non-limiting examples, will see messages in their sent items folder, and messages routed in this manner may be more compliant with new spam policies such as Sender Policy Framework (SPF) and Sender Id. In addition, messages sent via corporate mail servers 52 will have proper name resolution both at the global address list level and the personal level. It should be understood, however, that the use of the mail service provider 50 to deliver mail may be dependant on partner agreements and/or protocol, depending upon the given implementation.

The architecture described above also advantageously allows for features such as on-demand retrieval of message bodies and attachments and multiple folder support. Morever, a "this-is-spam" button or indicator may be used allowing company labels and other service provider-specific features when supported by an underlying protocol, as will be appreciated by those skilled in the art.

One particular advantage of the direct access system 20 is that a user need not configure an account before integrating additional accounts. However, a standalone email address may be used, and this address advantageously need not be tied to a mailbox size which the subscriber is required to manage. For example, the email account may be managed by an administrator, and any mail could be purged from the system after a pre-determined period of time (i.e., time-based autoaging with no mailbox limit for all users).

Additionally, all aspects of any integrated email account creation, settings and options may advantageously be available to the user from their mobile wireless communications device 25. Thus, users need not visit an HTML site and change a setting, create a filter, or perform similar functions, for example. Of course, an HTML site may optionally be used.

As a system Internet email service with the direct access system 20 grows, ongoing emphasis may advantageously be placed on the administrative site to provide additional information to carrier administrators, support teams, and similar functions. However, in some instances a mail connector may be installed on a personal computer, and this functionality may not always be available from the mobile wireless communications device.

The Web client engine 22 may advantageously support different features including message to handheld (MTH), message from handheld (MFH), forward/reply a message, request to view more for a large message (e.g., larger than 2K), request viewing message attachment, and over the air folder management (OTAFM). These functions are explained below.

For an MTH function, each email account integrated for a user is linked with the user device through a Web client service book. For each new message that arrives in the Web client user mailbox, a notification that contains the new message information will typically be sent to a Web client engine supervisor 34, which in turn will assign the job to an available worker with the least load in the system. The chosen worker 32 will validate the user information and retrieve the new message from the user source mailbox and deliver it to the user device via a port agent 30.

In an MFH function, MFH messages associated with a Web client service book are processed by the Web client engine 22 and delivered to the Internet 49 by the worker 32 via direct access proxy 40. If a user turns on the option to save the sent message to the sent items folder, the direct access proxy will save a copy of the sent message to this folder.

In a Forward/Reply/More function, the user can forward or reply an MTH or MFH message from the mobile wireless communications device 25 as long as the original message still existed in the direct access proxy cache or in user mailbox. For MTH, the worker 32 may send the first 2K, for example, or the whole message (whatever is less) to the user device. If the message is larger than 2K, the user can request MORE to view the next 2K of the message. In this case, the worker 32 will process the More request by retrieving the original message from the user source mailbox, and send back the 2K that the device requests. Of course, in some embodiments more than 2K of message text (or the entire message) may be sent.

In an attachment-viewing function, a user can view a message attachment of a popular document format (e.g., MS Word, MS Power Point, MS Excel, Word Perfect, PDF, text, etc.) or image format (GIF, JPEG, etc). Upon receiving the attachment-viewing request, which is implemented in a form of the more request in this example, the worker 32 can fetch the original message from the user source mailbox via the direct access proxy, extract the requested attachment and request the attachment server 36 to convert this document to extract and format the requested data. Once the attachment server 36 completes the request and sends the result back to the worker 32, the worker then processes it and sends the result back to the user device. The processing requires that the original message has not been deleted from the user Web client mailbox.

In the save sent message to sent items folder function, if the user turns this option on, the worker 32 places a copy of each MFH message sent from the user device in the user sent items folder in the mailbox. In over the air folder management, the Web client OTAFM service maintains any messages and folders in the user mailbox synchronized with the user device over the air.

Whenever a message in the user source mailbox is Moved/Deleted, the associated message on the device may also be Moved/Deleted accordingly, and vice-versa. When a message is Moved/Deleted on the device, the associated message in the user Web client mailbox may also be Moved/Deleted accordingly. Similarly, when a folder is Added/Removed/Renamed from the user Web client mailbox, the associated folder on the device may be Added/Removed/Renamed, and vice-versa.

The system 20 may advantageously support different subsets of various messaging features. For example, in the message to handheld function, the mobile office platform 24 may be responsible for connecting to the various source mailboxes 51, 53 to detect new emails. For each new mail, a notification is sent to the Web client engine 22 and, based on this notification, the supervisor 34 chooses one of the workers 32 to process that email. The chosen worker will fetch additional account information and the contents of the mail message from the direct access proxy 40 and deliver it to the user device 25.

In a message sent from handheld function, the MFH could be given to the direct access proxy 40 from the Web client worker 32. In turn, the mobile office platform 24 delivers a message to the Internet 49 by sending through a native outbox or sending it via SMTP. It should be understood, however, that the native outbox, whenever possible, may provide a better user experience, especially when taking into account current anti-spam initiatives such as SPF and sender Id.

In a message deleted from handheld function, when a message is deleted from the device 25, the Web client engine 22 notifies the mobile office platform 24 via the direct access proxy 40. As such, the mobile office platform 24 can delete the same message on the source mailbox.

When handling More/Forward/Reply/Attachment viewing requests, the Web client worker 32 may request an original mail from the direct access proxy 40. It will then process the request and send the results to the mobile wireless communications device 25. The architecture may additionally support on-demand retrieval of message parts and other upgrades, for example.

Upon the integration of a new source mailbox 51, 53, the service book notification from the alert server 38 may be sent to the supervisor 34, which assigns this notification to a worker 32 for sending out a service record to the device. Each source mailbox 51, 53 may be associated with a unique service record. In this way, each MFH message is linked with a source mailbox 51, 53 based on the service record on the device.

The system 20 may also poll the integrated external mailboxes periodically to check for new mail and to access any messages. The system 20 may further incorporate optimizations for polling bandwidth from an aggregation component allowing a quick poll. The system 20 can also advantageously support a large active user base and incorporate a rapidly growing user base.

The topology of load balancing can be based on the size of a component's queue and its throughput. These load statistics can be monitored by a mechanism in one example called the UDP Heartbeat, as described before. If a component is overloaded or has a large queue size, the component will have less chance to get an assigned job from other components. In contrast, a component will get more assigned jobs if it completes more jobs in the last few hours than other components. With this mechanism, the load could distribute over heterogeneous machine hardware, i.e., components running on less power machines will be assigned fewer jobs than those on machines with more power hardware.

General load balancing for any mobile office platform components can be accomplished through the use of a load balancer module, for example, a BIG-IP module produced by F5 Networks of Seattle, Wash. BIG-IP can provide load balancing and intelligent layer 7 switching, and can handle traffic routing from the Internet to any customer interfacing components such as the WAP and HTML proxies. The use of a BIG-IP or similar module may provide the application with pooling capabilities, fault tolerance and session management, as will be appreciated by those skilled in the art.

Typically, access to a single source mailbox 51, 53 can be from a single direct access proxy 40 over a persistent connection. Any requests on behalf of a particular user could persist to the same machine in the same direct access clustered partition. As certain components are system-wide and will be handling work for users across many partitions, these components can be designed to determine which direct access partition to communicate with on a request-by-request basis.

The load balancer and cache (LBAC) 46 may support this function. The LBAC 46 is a system-wide component that can perform two important functions. The first of these function is that it provides a mapping from the device PIN to a particular direct access proxy 40, while caching the information in memory for both fast access and to save load on the central database. Secondly, as the direct access proxy 40 will be run in clustered partitions, the LBAC 46 may distribute the load across all direct access proxies within any partition.

The LBAC 46 can be formed of different components. For example, the code which performs the load balancing can be an extended version of a secure mail connector. The code can also perform lookups to the central database and cache the results (LBAC).

In one non-limiting example, when a worker requires that a direct access proxy 40 perform work, it provides the LBAC 46 with a device PIN. The LBAC 46 will discover which partition that PIN is associated with by looking in its cache, or retrieving the partition identifier from a central database (and caching the result). Once the partition is known, the LBAC 46 then consults its cache to see which direct access proxy in that partition has been designated to handle requests for that PIN. If no mapping exists, the LBAC requests the PDS to create a new association on the least loaded DA proxy 40 (again caching the result). Finally, the LBAC 46 responds to the worker 32 with the connection information for the proper direct access proxy to handle that particular request.

The secure mail connector 88 may run in failover pairs, where one is an active master and the other is a secondary standby. Internal data structures may be replicated in real-time from the master to the standby Multiple LBACs 46 can be run for scalability and fault tolerance, but typically would require an external connection balancing component, such as the BIG-IP component as explained before.

A receiving component in the Web client engine 22 saves the job that has been assigned to it from other components to a job store on the disk before processing. It can update the status of the job and remove the job from the job store when the job processing is completed. In case of component failure or if the process is restarted, it can recover the jobs from the job store and, based on the current statuses of these jobs, continue processing these jobs to the next state, saving the time to reprocess them from the beginning.

Any recovery from the standpoint of MTH/MFH can be achieved through current polling behavior and on the Web client engine 22 recovery mechanisms. From within the mail office platform components, until a message has been successfully delivered to a Web client engine 22, that message is not recorded in the partition database 60. During the next polling interval, the system can again "discover" the message and attempt to notify the Web client engine 22. For new mail events, if an event is lost, the system can pick up that message upon receiving the next event or during the next polling interval. For sources supporting notifications, this interval could be set at six hours, as one non-limiting example. For messages sent from the Web client engine 22, and for messages that have been accepted by the Web client engine, recovery can be handled by different Web client engine components.

The Web client engine 22 may advantageously be horizontally and vertically scalable. Multiple supervisors 34 can be registered/configured with direct access proxies 40 to provide the distribution of the notification load and the availability of engine service. Multiple workers 32 and port agents 30 can run on the same machine or across multiple machines to distribute load and achieve redundancy. As the number of users grows, new components can be added to the system to achieve high horizontal scalability.

It is possible for a new component to be added/removed to/from the system automatically without down time. Traffic can automatically be delegated to a new component and diverted away from failed components. Each component within the mobile office platform 24 can be deployed multiple times to achieve horizontal scalability. To achieve vertical scalability, each mobile office platform 24 component can be a multi-threaded process with a configurable number of threads to scale under heavy load. Pools of connections can be used to reduce the overhead of maintaining too many open connections.

Figure 6:
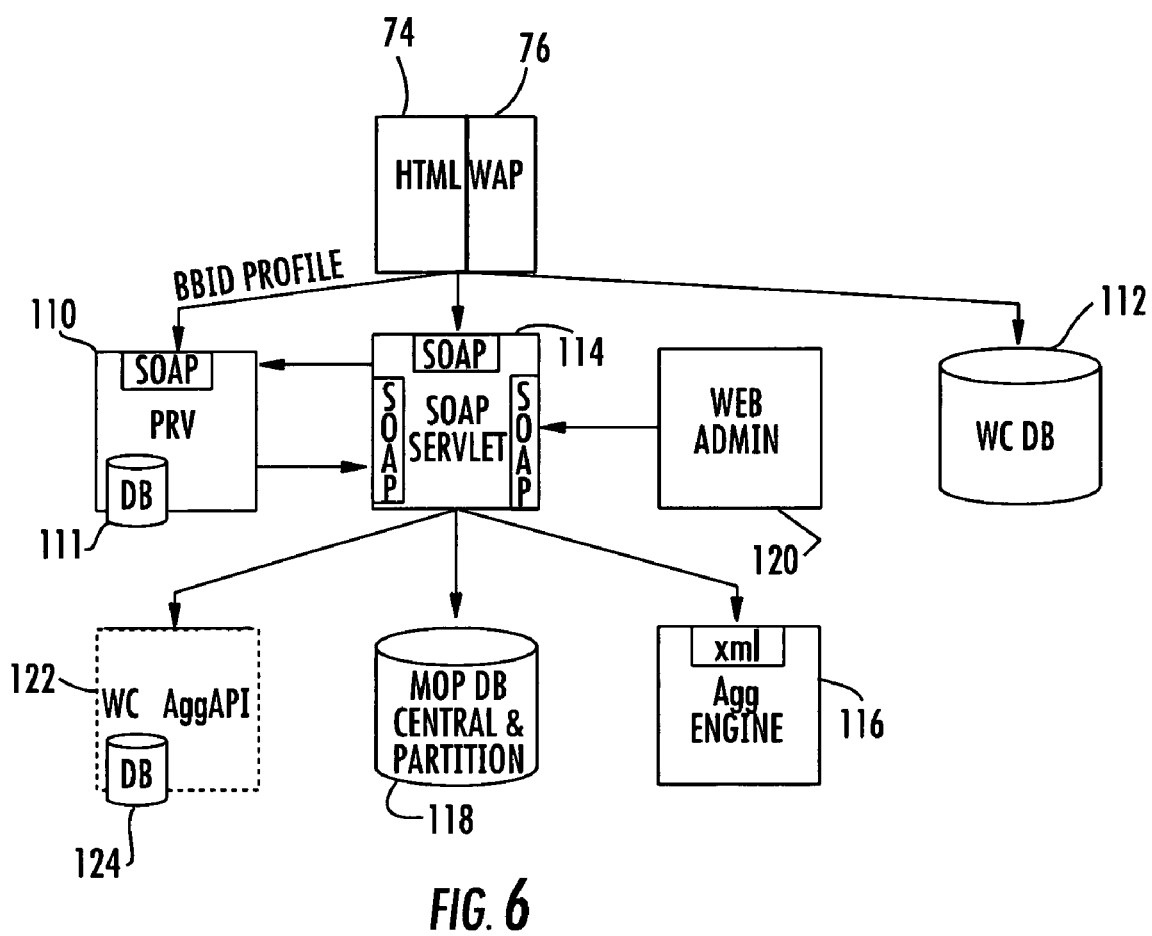
FIG. 6 is a schematic block diagram of another embodiment of user interface components of the direct access proxy similar to that shown in FIG. 2.

FIG. 6 is another embodiment of the high level architectural diagram of the DA user interface components similar to the functional components shown in the diagram of FIG. 2. There will now follow a brief description of these basic components and their function.

Provisioning (PRV) 110 provides a centralized database 111 or store to access user and device Identifier (ID) profile information. During login, the WAP and HTML Proxies 74, 76 retrieve the ID profile, which provides user and device information. Proxies update PRV 110 for certain user configuration actions, such as a changed PIN. The web client database 112 (WC DB) contains account information for web client users. It is queried during login to determine if an unknown user is a web client user and whether they can be migrated. The WAP Proxy 74 provides a Wireless Markup Language (WML) based user interface for configuration of source mailboxes in the Mobile Office Platform (MOP). The HTML Proxy 74 provides an HTML based user interface for configuration of source mailboxes in MOP. The Soap Servlet 114 (SOAP Daemon) provides an interface into a database store. The Agg Engine 116 acts as a protocol translator that connects to a source mailbox to validate configuration parameters. The Mobile Office Platform Database (MOP DB) 118 is a primary user data store for the MOP. The Web Admin 120 provides the MOP with notifications of account state changes. Provisioning 110 also provides notification of account state changes, such as inactive and active. Provisioning (PRV) can be used to notify and migrate a user from a Web Client (WC) service to an Internet Service (IS), having more advance features that are accessible from a web browser with a user email account, allowing a user to add and edit email accounts.

The Web Client Aggregation Programming Interface (WC AggAPI) 122 includes a database 124 and provides integrated source data for WC accounts. It is queried to retrieve integrated source configuration data to be migrated to a new Internet Service (IS) account for the user. The WC DB 112 provides web client account information. It is queried to retrieve web client account configuration data to be migrated to a Internet Service account for the user. The system can make use of existing products such as the Provisioning 110 and WebAdmin 120. These products have scaling characteristics. In this described embodiment, functionality has moved from Aggcron to the DA proxy. The system provides a direct connection to a partition database within the DA proxy. Access to the database can be from a configurable connection pool that will grow and shrink as necessary, depending on the needs of the system. The pool can recover from network errors and database connectivity issues.

Figure 7:
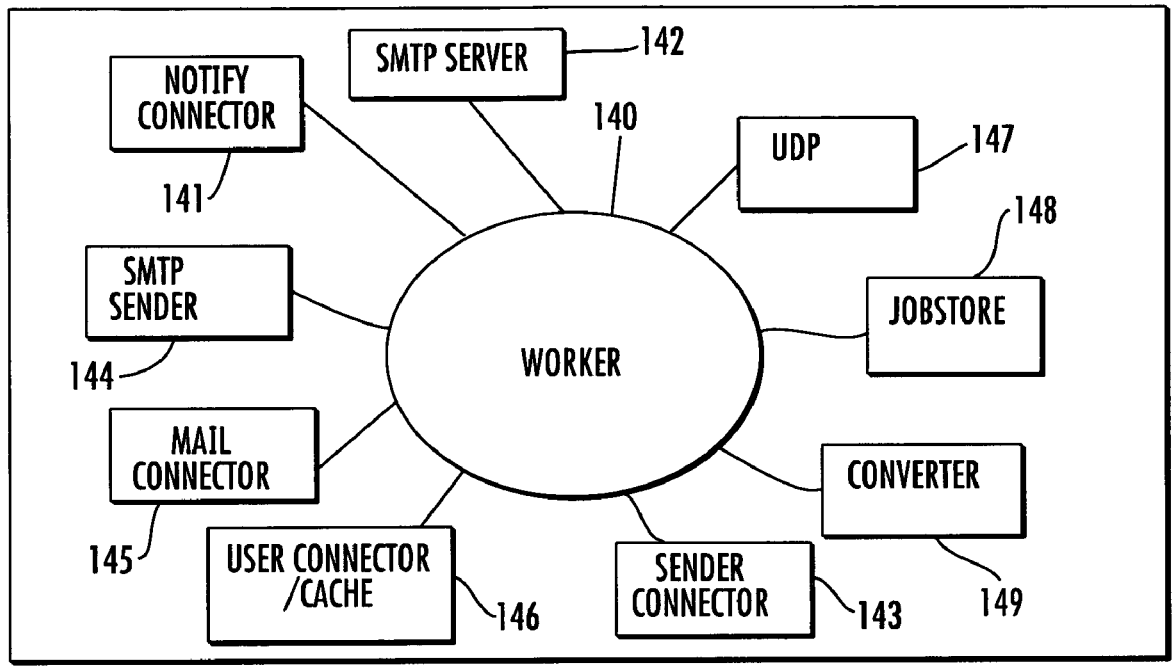
FIGS. 7 is a system diagram of the mail engine in accordance with one non-limiting example and showing basic components operative with the worker.
Figure 8:
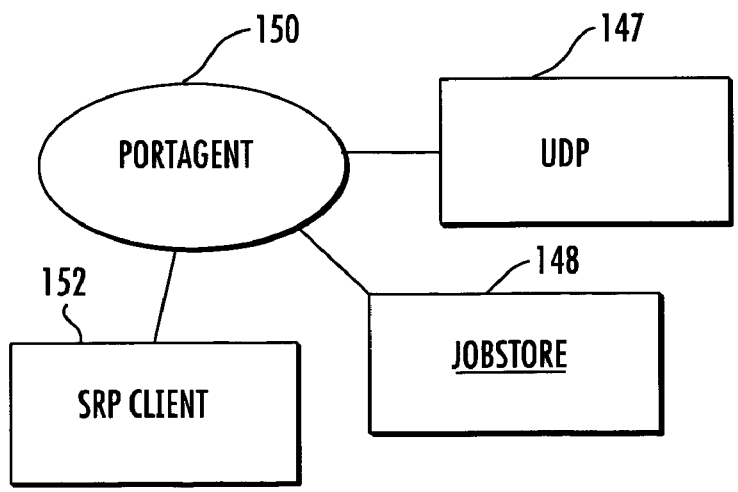
FIG. 8 is a block diagram of the mail engine showing basic components operative with the port agent.

In accordance with a non-limiting example, FIGS. 7 and 8 show basic, high-level components operative with the Worker 140 and Port Agent 150. As shown in FIG. 7, the Worker 140 is operative with NotifyConnector module 141, SMTPServer module 142, SenderConnector module 143, SMTP sender module 144, MailConnector module 145, UserConnector/Cache module 146, UDP module 147, jobstore (database) 148 and converter module 149. The Port Agent 150 is operative with the SRP client 152, jobstore 148, and UDP 147.

There now follows a summary of the mail engine function that can be operative with components described above and can be used with modification to the system and method of acknowledging the delays as will be explained in greater detail below.

Message to Handheld (MTH) messages are sent to the worker through an SMTP server. The SMTP connection is not released until the message is delivered, or until after waiting for a certain amount of time. After the message is received, the number of pending jobs is checked to determine if an x pending job limit has been reached for the user. The purpose of the x pending job limit is to avoid sending too many messages to a user that is out of coverage. If the limit is reached, the job is stored in a pending queue. If the limit has not been reached, the job is sent to an assigned queue, and the job is processed.

A first step in processing is to search for the user in the user cache. If the user is found in the user cache, the user information is retrieved. If the user is not stored in the user cache, i.e., not located, the cache will retrieve the user information to make the information available. After the user information is successfully retrieved, the message is converted to CMIME and saved to the jobstore. The CHIME message is sent to the Port Agent 150 for processing. The Port Agent 150 sends a COMMIT response for the job immediately after receiving the message, and begins processing the job. If the user is in coverage, the delivered response is received by the Port Agent 150. The Port Agent 150 then sends a COMPLETED response so the job can be released from the SMTP server. If the user is out of coverage and the job has waited for more than X minutes, the job is released from the SMTP server. In the case where a COMMIT response is not received in a certain amount of time, the Worker 140 resends the job. The same events occur in the case where a COMPLETED response is not received. If the user is out of coverage, however, and the Port Agent 150 cannot reach the device, a STORED response is sent to the Worker 140, so the Worker 140 can retry sending the job after a considerable amount of time has passed.

When MFH messages are received by relay, they are assigned to the Port Agent 150. In Mail system, the Port Agent 150 does not ACK the job to the relay immediately, which differs from same known Web Client and Internet Server systems. Instead, it sends the job to the Worker, and waits for about two minutes (configurable timer). If the Port Agent 150 receives a status COMMITTED or COMPLETED from a worker within this two minutes, it sends the ACK back to relay. For most cases, the job will be complete within a few seconds and the ACK will be sent after completion. Therefore, there will usually be no need to put the MFH jobs in the Port Agent 150 or Worker jobstore, which reduces I/O usage and enhances performance. In the case where a timeout occurs, the Port Agent 150 will remove the job from its memory jobstore without sending the ACK back to relay so that the relay will resend the MFH job. If there is no ACK that is sent back to relay after 10 minutes, the relay will send an X back to the device to indicate service error. After the Worker sends COMMITTED to the Port Agent and the Port Agent ACKs to relay, the Worker takes responsibility for the job completion.

The user cache is designed to minimize the load on the user database by keeping all of the user information in a cache, which the Worker will hold. This will also allow the Worker to continue running in the event that the database shuts down. The user cache in one non-limiting example is simply a table containing all the user information, and based on specified heuristics, this cache is cleared according to memory usage and requirements. If the system is running low on memory, some users will be cleared. The users that are chosen for clearing are those with the least chance of being called again. After the user information is requested, the user information that is contained in the user cache is used (if the user exists in memory). If the user does not exist in memory, the information is retrieved from the database, and the cache is updated. When there is a change to a user in the user-database, a notification is sent to the cache, which updates the user that was changed in order to keep the cache up to date.

Messages reach the mail system through an SMTP server running in the Worker. For redundancy, there will be multiple Workers serving a pool of mail-routers. Load balancing is required to ensure that the workload is balanced among the Workers, and a mail router is used to route the mail. This can be accomplished using a BigIP or any kind of an SMTP server such as send mail or postfix.

In the mail system, two levels of mail routing can exist. The main mail router performs a lookup of the recipient's email address to determine which cell the mail must be routed. The main mail router load balances among the cell mail routers and sends mail to the cell mail router with the least workload. The cell mail router load balances and routes the mail message to one of the Workers in the cell. If a mail router or mail Engine is not available, mail will be routed to an available mail router or mail Engine.

For mail-to-mail messages uses the mail system, a receipt is sent to acknowledge that the message was read and/or delivered to the device. The option for receiving a receipt for the message is sent from the device as part of the CMIME message. This is converted, and placed in the MIME message header, along with some additional information, which is required for the receipt generation. This message is sent to the user over the Internet. After the message is received in their inbox, and is sent into the mail system again, the system detects in the MIME header that a receipt is requested for this message. The message is then composed and sent.

Java devices typically will have support for delivery receipts. Read receipts could also be supported. If a device supports this feature, it will have the ability to receive both read and delivery receipts. If a device does not support this feature, it will have the ability to receive delivery receipts, but not read receipts.

As mentioned above, MTH and MFH messages have timeouts and retries in case of any failure on any of the components. This mechanism adds redundancy to messages, and may cause duplication. Duplication is not possible, however, for MTH messages, and is very rare for MFH messages. If a component fails, the other components can receive the messages and process them until the component is restored, without any downtime. Recovery is achieved for MTH through a CMIME jobstore in the Worker, which stores the messages on disk. In the case of Worker failure, the jobs are recovered from the jobstore when it is started back up. The same recovery occurs in the case of Port Agent failure.

If a user cannot be looked up in the system, or if the message has failed to deliver for a certain amount of time, the message is "bounced" back to the sender. The message is bounced back immediately if the recipient cannot be found. If the Port Agent fails to send the message after X number of days, the message is bounced back to the sender.

There can be two phases of this implementation. The first phase involves the implementation of encryption/decryption on the mail, and the key, which is stored in the user database, which are sent to the device with the service book in plaintext. For this reason, the key-exchange mechanism is not secure. Even though the messages are encrypted, they are not always secure. In order to have complete security, the OTA Key Generation be in place. This is planned for the second phase of security in the mail system.

The system may be required to support over the air (OTA) meeting requests, without any calendar server synchronization. This feature can be accomplished by sending CMIME-encapsulated CICAL (x-rimdevicecalendar) attachments to and from the device. Since the Mail system uses a standard vehicle for email sending (i.e. SMTP), it is not desirable to have proprietary CICAL attachments sent over the Internet, so another Internet standard, iCalendar (vCalendar 2.0), is adopted.

The Mail Engine supports the SRP pushback feature implemented on Relay. This means that a MTH message is pushed backed to the Mail Engine Port Agent when the message cannot be delivered (e.g. out of coverage). As a result, the relay does not need to store the message. When the engine receives the notification of the user being out of coverage, it marks the first message received as out of coverage for the user, as a KEEP message. The KEEP message is kept and retried at the Port Agent. Any subsequent messages for the out-of-coverage user are marked as DELETE in that worker, and as a result, the Port Agent deletes it rather than retrying. In this case, the worker takes responsibility for the DELETE messages belonging to the user that is out of coverage. The Port Agent is therefore only required to store one message per worker per user if the user is out of coverage. The worker still stores the user's messages and keeps retrying. After the worker knows that the user is out of coverage, and this notification comes from the relay, the worker stops sending messages for this user, even before the X pending job limit is reached.

When the user is back in coverage, a notification is received so the Port Agents can send all pending jobs for the user. After the COMPLETE is sent back to the worker, the worker realizes that the user is back in coverage and resends the jobs that were previously deleted from the Port Agents.

The Mail system in a non-limiting example introduces a delayed ACK for MTH jobs. This had several benefits, including a reduced disk I/O because the job does not have to be saved to disk until its acknowledged, and easier recovery. If the component crashes before it sends the ACK, the sending process will automatically take responsibility for the job. In many aspects, MFH messages in the Mail system are handled in a similar fashion to MTH and the system introduces a delayed ACK for MFH jobs as well.

This feature is configurable in the Port Agent. If it is configured such that the feature will not be used, the component will perform the same as before the feature was introduced. If this feature is not used, the same existing code path will execute.

For every completed job, an ACK is sent. Furthermore, to eliminate excessive load on the relay, only a single ACK should be sent for each MFH job. If a job is completed before some configurable timeout, the job should not reside on disk. This will eliminate a considerable amount of I/O wait time for the Port Agent. Equivalently, this feature should reduce disk I/O by as much as possible.

A new Object could be the MFH equivalent of a NewMTH-TimerHandler module. It could maintain all the ACK timeouts. The timer identifier will hold all the information needed to identify an ACK in the JobSender, such as the JobId and ManId. Currently, most MFH handling is accomplished by the JobSender and therefore many of the changes for this feature will affect this module.

A table could be added that will maintain a list of ACKs that need to be sent. The table could contain the information required to send an ACK and will use this information that uniquely identifies an ACK (JobId, ManId and SrpId) as a key. This table will ensure that no ACKs are lost, and will be used to ensure that only a single ACK will be sent. The ACK will be removed from the table once it is sent successfully.

A WorkItem will could be queued into the JobSender thread pool whenever an ACK should be sent. The 'type' of the WorkItem could be SEND_SRP_STATUS, a type value that exists in the Port Agent. The JobSender could schedule a timer with the NewMFHTimerHandler module instead of sending an ACK to the Relay. Nothing is saved at the jobstore at that time.

In two situations the ACK is sent. These situations depend on which event occurs first. Either the timeout is completed or the job is completed by a worker. If the timeout fires, the job will be saved to disk before it is ACKed. Otherwise, if the job is completed before the timeout fires then the job will not have to be saved.

The Port Agent can receive the COMPLETE at any time. It may be difficult to determine if the ACK has been sent for this job or not. For every COMPLETE, the timer could be cancelled (it may have already fired and no longer exist), and a job is enqueued to the JobSender thread pool to send the ACK. Ti should be understood that the ACK will be sent if it exists in the table identified above, and it will exist in the table if the ACK needs to be sent. This is a clean way to eliminate ACK race conditions in the Port Agent and ensure that one and only one ACK is sent per job.

In some cases it is not necessary to save any record of the job in the index file. Currently the index file is used to maintain the job state (eg. COMMITED/COMPLETED/etc.). The Mail System may to save a record of the job in the index file when it receives it to maintain state. For example, the Port Agent assigns the job to a Worker and the Worker sends it back to COMMIT. The Port Agent times out and saves the job to disk. At this point, it does not know if the job has been committed or not. For example, when it received the COMMIT, it had nowhere to update the job's status, and as a result, the Port Agent crashes. During recovery, the system does not know how to handle the job that was saved. If it was not COMMITTED, it should be resent. If it was COMMITTED, it should be resent but only after a much longer 'completed timeout.' For this reason, the system could save to the index file for every job. It should be understood that an I/O reduction scheme for the Port Agent takes this approach Currently, when the Port Agent in the Web Client and Internet Server is accepting MFH GME packets from the Relay, it will save the job to the MFH stream jobstore and sends ACK,s back to the Relay to acknowlege that it has safely received the MFH message and will process the message. The Port Agent ensures that the MFH message will be assigned to one of the workers in the system. Upon completion of processing this MFH message, the worker will notify the Port Agent if the message has been processed so that the Port Agent will remove the MFH job from its jobstore. In the case of an error when processing the message, the Worker will compose an error message and send it back to the device, which marks an X for the message with an error code.

From the Relay perspective, when it receives an MFH message from the device, it will look up and assign the job to an available Port Agent. Relay then expect an ACK from the Port Agent within two minutes, in one non-limiting example. Other time periods can be used depending on designs chosen by those skilled in the art. If there is no ACK from the Port Agent within two minutes, the Relay will try again with the same Port Agent if the connection is still valid. If the current Port Agent connection is not available, it will try another Port Agent until it receives the ACK. If the retry fails for up to 10 minutes, the Relay will send an X to the device itself to indicate that the service is not available. The ACK is returned from an old connection or expired and any retry to the relay will be ignored.

Thanks to the existence of Relay retry mechanism, the Mail Engine can take advantage of this feature to reduce the maintenance at the jobstore for the Web Client and Internet Server Engine and the I/O for the Port Agent. With the new optimization, the Port Agent will not send the ACK back to Relay right away when it receives the MFH data from Relay. Instead, it will delay this ACK and assign the MFH job to the worker. Until it receives either COMMITTED status or COMPLETED/FAILD status from the worker (within 2 minutes), it will send the ACK back to Relay to complete this MFH job. If there is no ACK back from the Port Agent within 2 minutes, the Relay will resend the job again. This scheme will help eliminate the Port Agent jobstore.

If the Port Agent does not get the any status (COMMITTED/COMPLETED/FAILED) within two minutes, it means there is no ACK back to Relay in two minutes, the Relay could resend this job to the same Port Agent again if the original Port Agent still available. If the original Port Agent is not available, the Relay will send the MFH message to another Port Agent. There are timing windows that may cause job duplication. For example, when the Worker has completed sending the MFH job at the time the Relay tries to resend (after two minutes) or if the original Port Agent is not available, the resent MFH job will go to other Port Agent and may cause duplication. Also when the Worker has completed sending the MFH job, it could send COMPLETED status back to the Port Agent or Worker. It could send the COMMITTED back to the Port Agent after it saves the job to the jobstore. The Port Agent could send the ACK back to the Relay. If the ACK sending occurs at the moment of expiry that the Relay resends the MFH job again, this could cause a duplicated MFH job.

Figure 10:
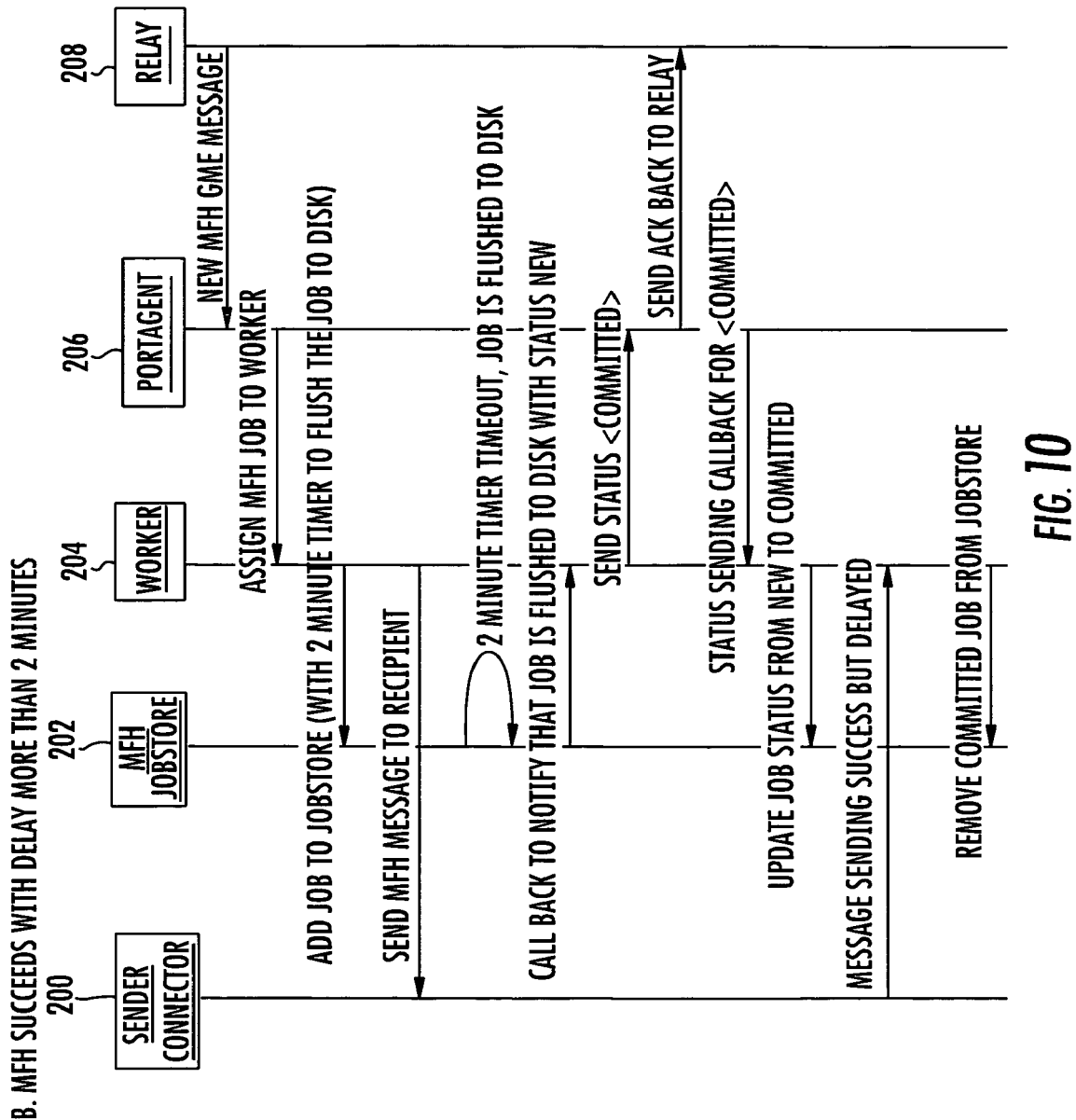
Figure 11:
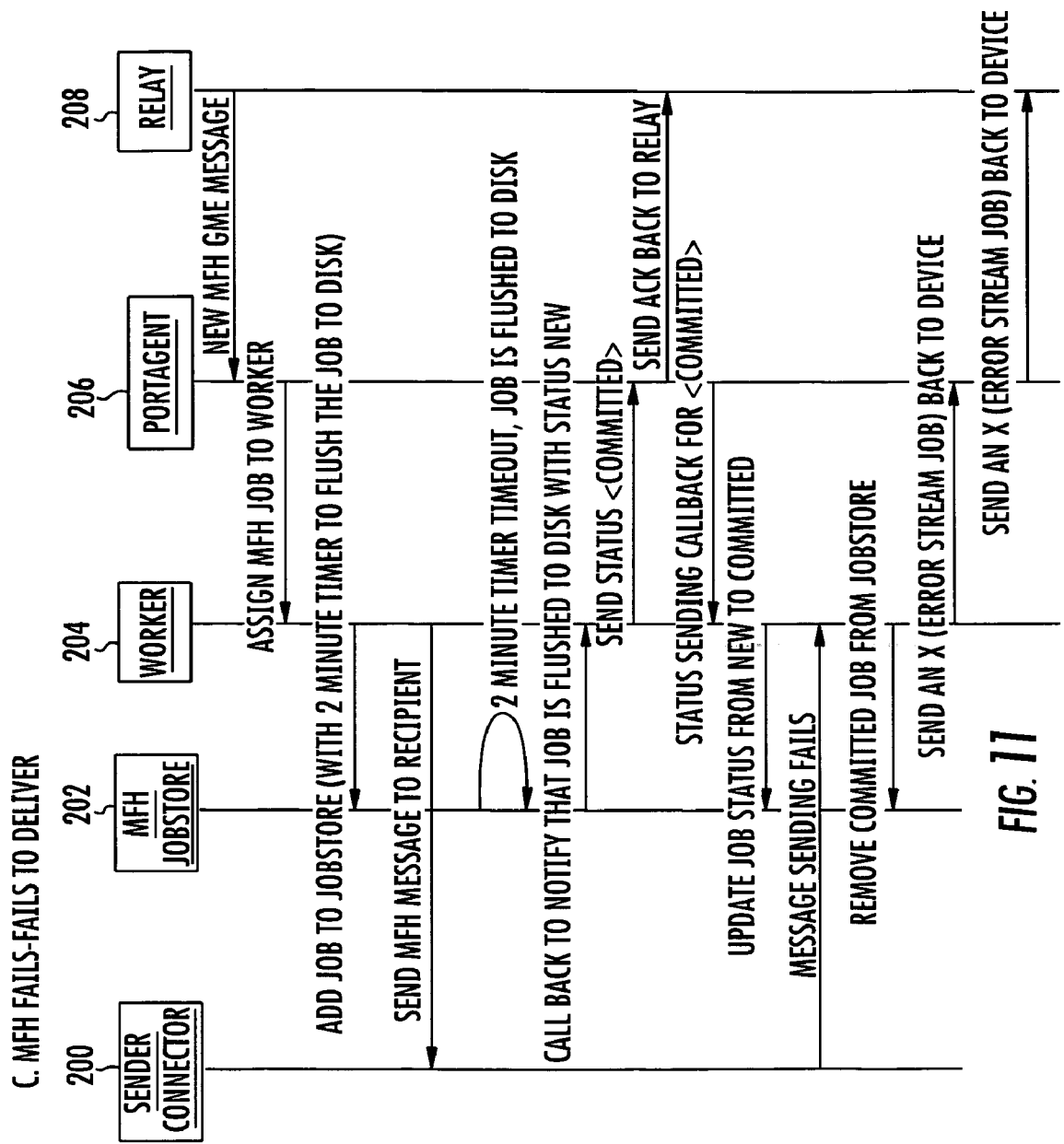
Figure 12:
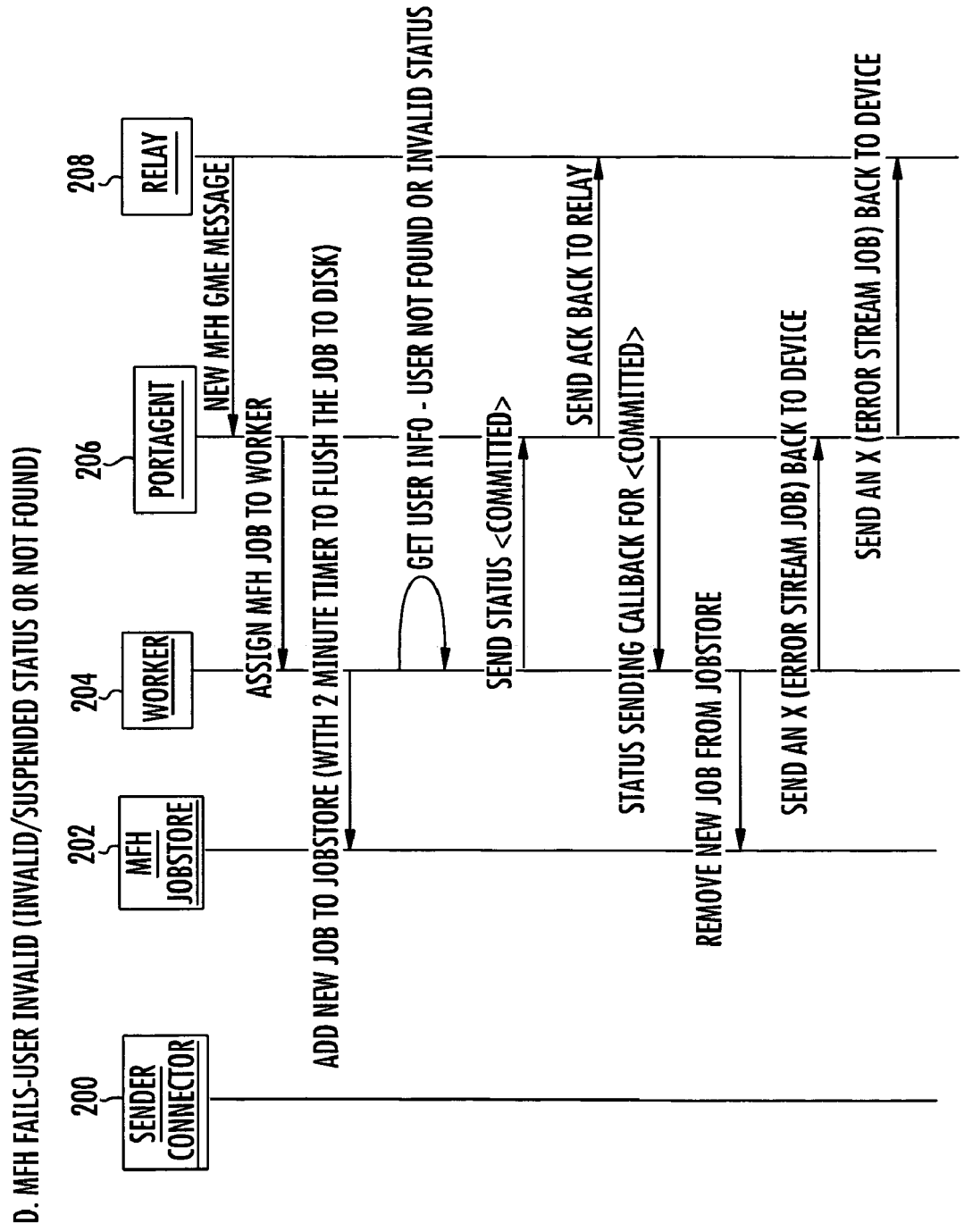

FIGS. 9-12 illustrate ACK delay sequence diagrams in which the message from handheld (MFH) with the SRP ACK delay sequence is shown in which the MFH succeeds within two minutes (FIG. 9); the MFH succeeds with the delay more than two minutes (FIG. 10); the MFH fails and fails to deliver (FIG. 11); and the MFH fails—the user is invalid (invalid/suspended status or not found) (FIG. 12). The various modules are shown with the sender connector 200; MFH jobstore 202; the worker module 204; the port agent module 206; and the relay module 208.

Figure 9:
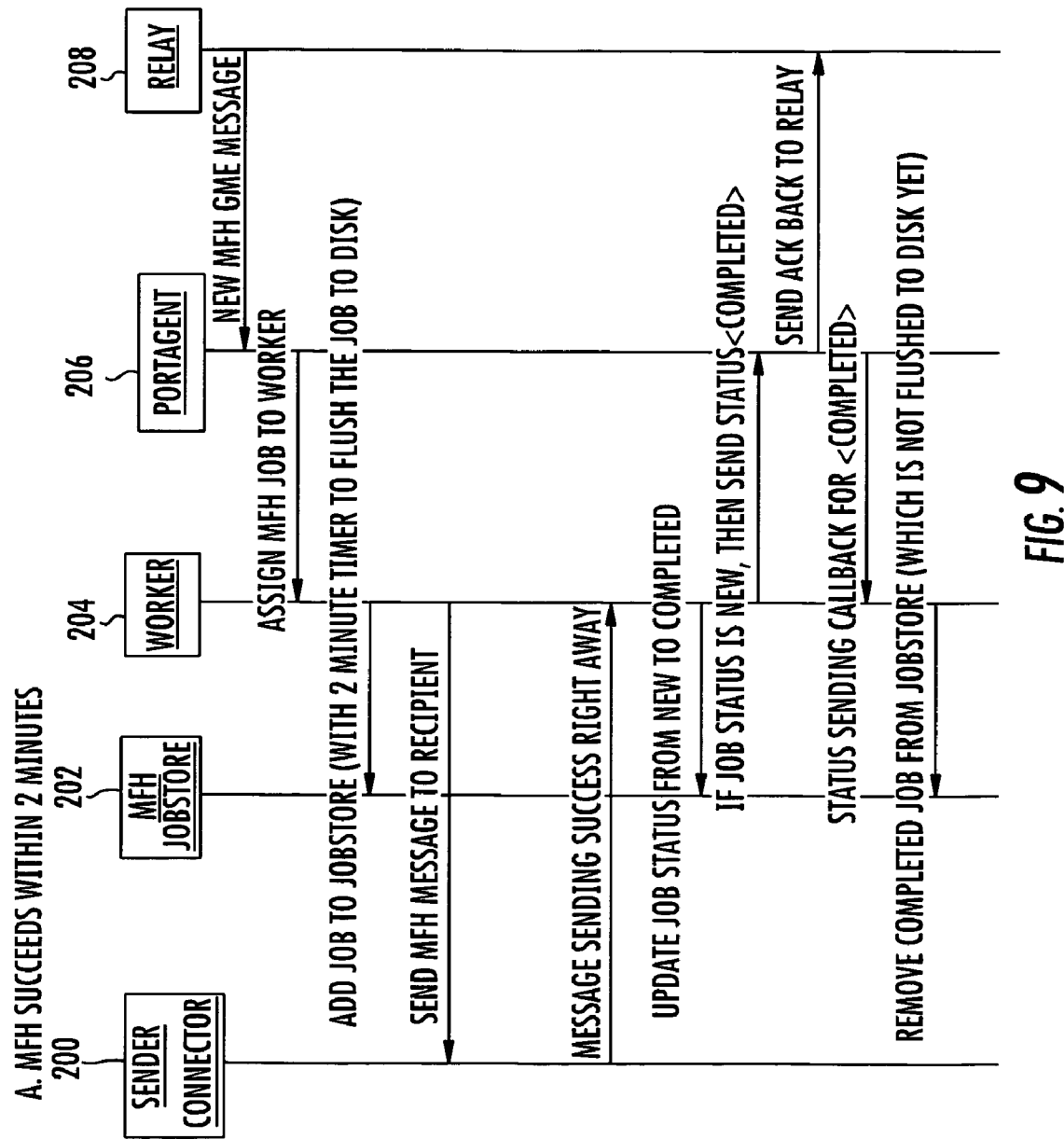
FIG. 9-12 are high-level acknowledgment (ACK) delay sequence diagrams in accordance with one non-limiting example.

As shown in FIG. 9, a new MFH GME message is transmitted from the relay to the port agent, which assigns the MFH job to a worker. The job is added to the jobstore with a two minute timer to flush the job to disk. The worker sends the MFH message to the recipient. The sender connector as the recipient message sends success and the back and forth occurs for the update of the job status from new to completed. If the job status is new, the completed status is sent. If the connection has been disconnected, an ACK can be sent back to relay and the status sending call back for completed can be sent with the completed job removed from the jobstore, which is not yet flushed to disk.

FIG. 10 shows a similar process, but with a two minute timer time-out if the job is flushed to disk with a call back to notify that the job is flushed to disk with the status of new. Also, a committed status is transmitted as shown.

FIG. 11 shows a similar process, but with an error stream job sent to the device as shown at the lower portion of the diagram.

FIG. 12 shows the various changes when an invalid/suspended status or not found occurs.

It should be understood that different programming languages could be used. For example, XML is an extensive mark-up language, and operative as a subset of the standard generalized mark-up language (SGML). It would allow data to be stored and published on websites and be richer in presentation. Custom tags could be created to define the content of documents. Common information formats could be created and the format and data shared on the internet, corporate internets and/or other networks. The mark-up symbols in XML could be unlimited and self-defining. The channel definition format (CDF) could describe any channel and a specific CDF file can contain data that specifies an initial web page and how it can be updated.

SOAP allows one program running in one kind of operating system to communicate with the program in the same or another type of operating system by using HTTP and XML for information exchange. SOAP could specify how to encode an HTTP header in an XML file, thus, allowing one computer to call a program in another computer and pass data, while also dictating how it can return a response. SOAP is advantageous to allow data to pass through firewall servers that screen-out requests other than those for known applications to a designated port. SOAP is an XML-based protocol that has at least three parts, including: (a) an envelope to define a framework for describing what is in a message; (b) a set of encoding rules for expressing application-defined data types; and (c) a convention for representing remote procedure calls and responses.

The mobile office platform 16 could include software that is implemented as an ActiveX control as a component object model (COM) and provide a framework for building software components that communicate with each other. ActiveX controls could be automatically downloaded and executed by a web browser. Distributed object applications could be built in active web pages and ActiveX controls could be downloaded to different browsers and clients. ActiveX controls could be held in a web browser as a container and distributed over an internet or corporate intranet. ActiveX controls could also manage and update web content and client systems and work closely with a user interface of a targeted operating system. Java applets or similar component objects could also be used instead of ActiveX controls. It should be understood for purposes of the present invention that an object model control could also be any type of dynamic link library (DLL) module that runs in a container as an application program using a component object model program interface.

An example of a handheld mobile wireless communications device 1000 that may be used is further described in the example below with reference to FIG. 13. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 13:
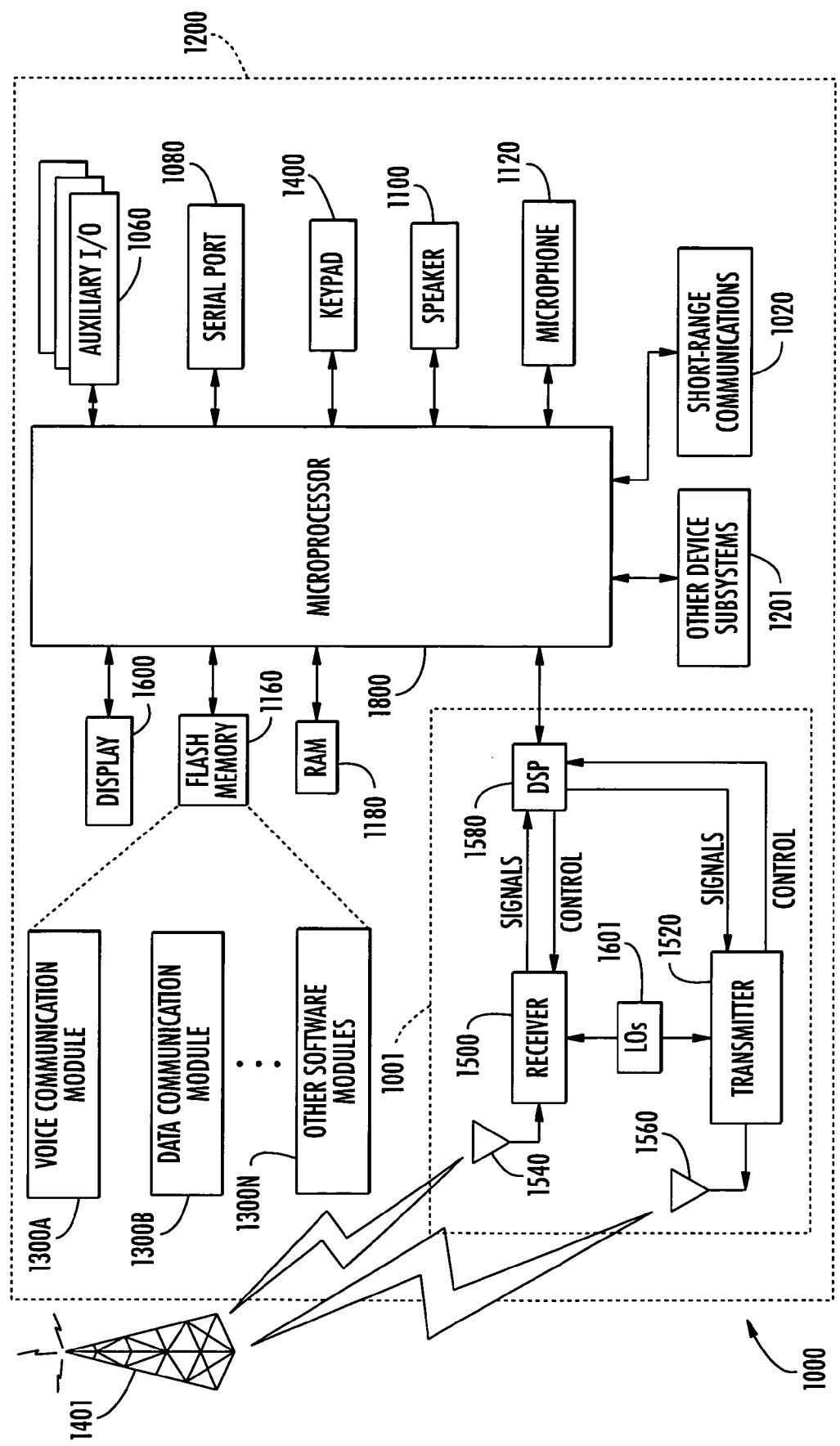
FIG. 13 is a schematic block diagram illustrating an exemplary mobile wireless communications device that can be used with the Direct Access system shown in FIG. 1.

In addition to the processing device 1800, other parts of the mobile device 1000 are shown schematically in FIG. 13. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic mail (email) communications system, comprising:
   a mobile office platform comprising a processor and a direct access proxy for accessing an electronic mailbox of the user and pushing email from the electronic mailbox of the user to a wireless communications device;
   a web client engine operative with the mobile office platform, and comprising a port agent module that communicates with the wireless communications device and operative to receive a message from a wireless communications device as a request corresponding to a job to be completed, and a worker module that receives the message from the port agent module for completing the job; and
   a database for storing requests corresponding to non-completed jobs,
   wherein the web client engine is operative for attempting to process a job within a specified delay time as a configurable time-out value dependent on the job to be completed, and if successful, transmitting an Acknowledgement (ACK) to the wireless communications device to indicate the job was completed without saving the request to said database, and if the job has not been completed within the specified delay time, saving the message as a request in the database and transmitting an ACK to the wireless communications device indicating that the request was received and is stored at the database, and further comprising a table of ACK's corresponding to jobs stored in the database, wherein when a job is completed, only one ACK corresponding to the completed job is transmitted to the communications device, and the ACK is removed from the table.

2. The electronic mail communications system according to claim 1, and further comprising a relay module that receives any messages from a wireless communications device and transfers any messages to an available port agent module.

3. The electronic mail communications system according to claim 2, wherein said relay module is operative for receiving an ACK from a port agent module and transferring the ACK to the wireless communications device.

4. The electronic mail communications system according to claim 3, wherein said port agent module is operative for delaying the transmission of an ACK back to the relay module while a worker module is assigned the request corresponding to the job to be completed.

5. The electronic mail communications system according to claim 3, wherein said relay module is operative for retrying communication with a port agent module if an ACK is not received within a specified delay time.

6. The electronic mail communications system according to claim 1, wherein said port agent transmits an ACK until it receives an indication that the request corresponding to the job to be completed is committed, completed or failed.

7. The electronic mail communications system according to claim 1, wherein said database comprises a port agent jobstore.

8. The electronic mail communications system according to claim 1, wherein said message comprises a Message From Handheld (MFH) data packet.

9. A method for communicating between a user of a wireless communications device and an electronic mail (email) server, which comprises:
   receiving at the email server from the wireless communications device a message as a request corresponding to a job to be completed at the email server;
   attempting to process a job within a specified delay time as a configurable time-out value dependent on the job to be completed, and if successful, transmitting an Acknowledgement (ACK) to the wireless communications device to indicate that the job has been completed without saving a request to a database; and
   if the job has not been completed within the specified delay time, saving the message as a request in a database that stores requests corresponding to non-completed jobs and transmitting an ACK to the wireless communications device indicating that the request has been received at the email server and is stored at the database, and further comprising a table of ACK's corresponding to jobs stored in the database, wherein when a job is completed, only one ACK corresponding to the completed job is transmitted to the communications device, and the ACK is removed from the table.

10. A method according to claim 9, which further comprises receiving the message within a port agent module that communicates with the wireless communications device over a port agent connection and assigning the request to a worker module for completing the job.

11. A method according to claim 10, which further comprises receiving the message within a web client engine that includes the port agent module and worker module that communicate with a mobile office platform that includes a direct access proxy for accessing an electronic mailbox of the user.

12. A method according to claim 10, which further comprises delaying transmission of an ACK from a port agent module and assigning to a worker module the request corresponding to the job to be completed.

13. A method according to claim 10, which further comprises receiving the message within a relay module and assigning the message to an available port agent module.

14. A method according to claim 13, which further comprises transmitting an ACK back to the relay module if no indication of committed, completed or failed is received.

15. A method according to claim 10, which further comprises retrying communication with another port agent module if a port agent connection fails.

16. A method according to claim 10, which further comprises receiving at the port agent module an indication that the request corresponding to the job to be completed is committed, completed or failed.

17. A method according to claim 10, which further comprises storing the message within a port agent module jobstore.

18. A computer-readable medium encoded with a computer program on a processor of a mobile office platform having computer executable instructions for executing functions relating to electronic mail delivery comprising:
   receiving at an email server from a wireless communications device a message as a request corresponding to a job to be transacted at the email server;
   attempting to process a job within a specified delay time as a configurable time-out value dependent on jobs to be completed, and if successful, transmitting an Acknowledgement (ACK) to the wireless communications device to indicate the job has been completed without saving the request to a database; and
   if the job has not been completed within the specified delay time, saving the request in a database that stores requests corresponding to non-completed jobs and transmitting an ACK to the wireless communications device indicating that the request has been received at the email server and is stored at a database, and further comprising a table of ACK's corresponding to jobs stored in the database, wherein when a job is completed, only one ACK corresponding to the completed job is transmitted to the communications device, and the ACK is removed from the table.

19. A computer-readable medium according to claim 18, which further comprises receiving the message within a port agent module that communicates with the wireless communications device over a port agent connection and assigning the request to a worker module for completing the job to be completed.

20. A computer-readable medium according to claim 19, which further comprises receiving the message within a web client engine that includes the port agent module and worker module that communicates with a mobile office platform that includes a direct access proxy for accessing an electronic mailbox of the user.

* * * * *